US00RE44461E

(19) United States
(12) Reissued Patent
Xu

(10) Patent Number: US RE44,461 E
(45) Date of Reissued Patent: Aug. 27, 2013

(54) METHOD, SYSTEM AND APPARATUS FOR PAGING ACCESS TERMINALS

(71) Applicant: Huawei Technologies Co., Ltd., Guangdong (CN)

(72) Inventor: Mingxia Xu, Shenzhen (CN)

(73) Assignee: Huawei Technologies Co., Ltd, Shenzhen (CN)

(21) Appl. No.: 13/685,726

(22) Filed: Nov. 27, 2012

Related U.S. Patent Documents

Reissue of:

(64) Patent No.: 8,050,725
Issued: Nov. 1, 2011
Appl. No.: 12/415,223
Filed: Mar. 31, 2009

U.S. Applications:

(63) Continuation of application No. PCT/CN2007/070796, filed on Sep. 26, 2007.

(30) Foreign Application Priority Data

Feb. 28, 2007 (CN) ..... 2007 1 0007196

(51) Int. Cl.
*H04W 68/00* (2009.01)

(52) U.S. Cl.
USPC ..... 455/458; 455/574

(58) Field of Classification Search
USPC ..... 455/574, 458, 412.2, 435.1
See application file for complete search history.

(56) References Cited

U.S. PATENT DOCUMENTS 7,149,535 B1 12/2006 Chaturvedi et al.
2006/0014550 A1 1/2006 Ryu et al.
2006/0293067 A1* 12/2006 Leung et al. ..... 455/458

FOREIGN PATENT DOCUMENTS

CN 1086647 A 5/1994
CN 1379963 A 11/2002
CN 1675949 A 9/2005

OTHER PUBLICATIONS

3rd Generation partnership Project 2" 3 GPP 2: "Inter-AN Paging Stage 2-3", dated Dec. 2006, total 20 pages.
3rd Generation partnership Project 2" 3 GPP 2: "Cdma 2000 High Rate Packet Data Air Interface Specification", 3GPP2 C.S0024 Version 2.0, dated Oct. 27, 2000, total 441 pages.
3GPP2 Network Evolution:"UMB IOS Mobility and Interfaces", dated Dec. 2006, total 21 pages.

(Continued)

*Primary Examiner* — Tu X Nguyen
(74) *Attorney, Agent, or Firm* — Huawei Technologies Co., Ltd

(57) ABSTRACT

A method for paging access terminals. The method includes: a network entity sends a paging message to a target AN. The paging message carries the information required for calculating the time when the AT wakes to monitor the paging message. The information includes the absolute time that is determined according to the time when the AT previously shifts from the connected state to the idle state. Upon receipt of the paging message, the target AN determines when to send the paging message to the AT according to the information carried in the paging message. The present embodiments also disclose a system and apparatus for paging access terminals. The apparatus is a network entity that sends the paging message. The method, system and apparatus can be used to determine the time when the AT wakes to monitor the paging message, thus ensuring that the AT paging is not missed.

12 Claims, 2 Drawing Sheets

(Amended)

(56) References Cited

OTHER PUBLICATIONS

Search report & Written Opinion issued in corresponding PCT application No. PCT/CN2007/070796, dated Nov. 29, 2007, total 5 pages.
3rd Generation partnership Project 2" 3 GPP 2: "Interoperability Specification(IOS) for High Rate Packet Data ( HRPD) Radio Access Network Interfaces With Session Control in the Access Network", 3GPP2 A. S008-A v1.0, dated Mar. 2006, total 259 pages.
3rd Generation partnership Project 2" 3 GPP 2: "Interoperability Specification(IOS) for High Rate Packet Data ( HRPD) Radio Access Network Interfaces With Session Control in the Access Network", 3GPP2 A. S008-B v1.0, dated Oct. 2006, total 502 pages.
Notice of allowance issued in corresponding U.S. Appl. No. 12/415,223, dated Jun. 2, 2011, total 16 pages.
International Search Report from P.R. China in International Application No. PCT/CN2007/070796 mailed Nov. 29, 2007.
P. Tinnakornsrisuphap et al, "A40-20061204-013r0 QC inter-AN paging for A.S0008," 3GPP2 TSG-A, Dec. 2006.
"cdma2000 High Rate Packet Data Air Interface Specification," 3GPP2 C.20024-A, Jul. 2005.
Written Opinion of the International Searching Authority (translation) dated (mailed) Nov. 29, 2007, issued in related Application No. PCT/CN2007/070796, filed Sep. 26, 2007, Huawei Technologies Co., Ltd.

* cited by examiner

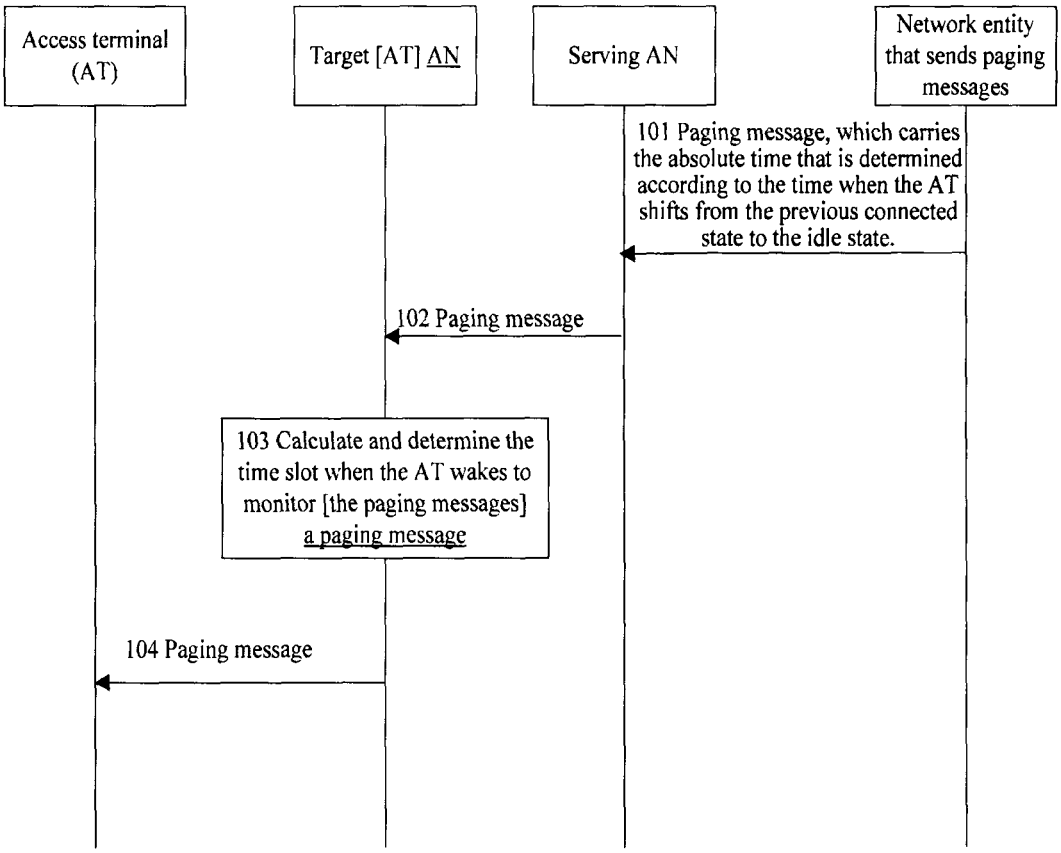
Figure 1 (Amended)

METHOD, SYSTEM AND APPARATUS FOR PAGING ACCESS TERMINALS

Matter enclosed in heavy brackets [ ] appears in the original patent but forms no part of this reissue specification; matter printed in italics indicates the additions made by reissue.

*CROSS-REFERENCE TO RELATED APPLICATIONS*

This application *is a Reissue Application of patent application Ser. No. 12/415,223 filed on Mar. 31, 2009, issued as U.S. Pat. No. 8,050,725 B2 on Nov. 1, 2011, which* is a continuation of international application number PCT/CN2007/070796, filed on Sep. 26, 2007, and claims the benefit of priority to Chinese Patent Application No. 200710007196.7, filed on Feb. 8, 2007, both of which are incorporated herein by reference in their entirety.

TECHNICAL FIELD

The present disclosure relates to the paging technology, and in particular, to a method, system and apparatus for paging access terminals.

BACKGROUND

Paging is a common technology in radio communication systems. It is applied in scenarios where a remote fixed station or a mobile terminal sends data to an access terminal (AT) in a radio communication system through the network. The network sends a paging message to access terminals according to the ID of each access terminal. The network entity controller in the network, which is responsible for sending the paging message, forwards the paging message to all the target access networks (ANs) within the paging area. These ANs then broadcast the paging message at a proper time.

The method for paging access terminals in the prior art includes the following steps: (1) The network entity that sends a paging message receives data from the network, and then sends the paging message to the current serving AN of the AT; (2) The current serving AN of the AT forwards the received paging message to each target AN; (3) Upon receipt of the paging message, each target AN calculates the time when the AT wakes to monitor the paging message according to some information carried in the paging message; and (4) At the calculated time, each target AN sends the paging message to the AT.

The key in the preceding method is to calculate the time when the AT wakes to monitor the paging message. To determine the time, there is a need to obtain the period that is adopted by the current AT and absolute time that is determined according to the time when the AT previously shifts from the connected state to the idle state.

The current paging message carries all the available periods of the AT. The message, however, does not carry the absolute time that is determined according to the time when the AT previously shifts from the connected state to the idle state. Therefore, in some special scenarios, the target AN fails to calculate the time when the AT wakes to monitor the paging message, thus missing paging the AT. The following describes two specific scenarios:

Before the AT disconnects and enters the idle state, the AT sends a Connection Close message to the current serving AN. The Connection Close message carries a future absolute time.

The AT enters the idle state after the absolute time. The current serving AN sends the Connection Close message carrying the absolute time to the anchor AN of the AT or any other network entity that sends paging messages. In this scenario, if the target AN that wants to send a paging message to the idle AT does not receive a Connection Close message from the AT and the network entities do not carry the absolute time in the Connection Close message when sending the paging message to the target AN, the target AN cannot obtain the absolute time when the AT enters the idle state. Therefore, the target AN cannot use the method in the prior art to calculate the time when the AT wakes to monitor the paging message, and thus misses paging the AT.

When the AT is disconnected exceptionally, for example, the radio link is lost, the AT cannot send a Connection Close message to the current serving AN. Besides, the current serving AN cannot send the absolute time when the AT enters the idle state to the anchor AN or other network entities that send paging messages. Hence, in this scenario, if the target AN that wants to send a paging message to the idle AT is not the serving AN in the case of exceptional disconnection of the AT, the target AN that wants to send the paging message can neither obtain the absolute time when the AT enters the idle state and nor use the method in the prior art to calculate the time when the AT monitors the paging message.

SUMMARY

The embodiments of the present disclosure provide a method, system and apparatus for paging access terminals. In this way, the time when the AT wakes to monitor the paging message can be determined so that the AT paging is not missed.

The method for paging access terminals provided in an embodiment of the present disclosure includes:

sending, by a network entity, a paging message to a target AN, carrying the information required for calculating the time when the AT wakes to monitor the paging message, wherein the information includes the absolute time that is determined according to the time when the AT previously shifts from the connected state to the idle state; and upon receipt of the paging message, determining, by the target AN, when to send the paging message to the AT according to the information carried in the paging message.

The system for paging access terminals provided in an embodiment of the present disclosure includes an AT, at least a target AN and a network entity that sends the paging message.

The network entity that sends the paging message is adapted to send the paging message to the target AN. The paging message carries the information required for calculating the time when the AT wakes to monitor the paging message. The information includes the absolute time that is determined according to the time when the AT previously shifts from the connected state to the idle state.

The target AN is adapted to receive the paging message and use the information carried in the paging message to calculate the time when the AT wakes to monitor the paging message. It also sends the paging message to the AT at the calculated time.

The AT receives the paging message sent from the target AN.

The apparatus for paging access terminals provided in one embodiment is a network entity that sends a paging message. The network entity includes a time storage unit and a paging message sending unit.

The time storage unit is adapted to store the absolute time that is determined according to the time when the AT previously shifts from the connected state to the idle state.

The paging message sending unit is adapted to obtain the absolute time from the time storage unit. It carries the absolute time with other information used for calculating the time when the AT wakes to monitor the paging message, within the paging message, and sends the paging message to the target AN.

As seen from the preceding technical solution, by carrying in the paging message sent to the target AN, the absolute time that is determined according to the time when the AT previously shifts from the connected state to the idle state. The embodiments ensure that the target AN can calculate the time when the AT wakes to monitor the paging message according to the information carried in the paging message, and ensure that the paging message is sent to the AT successfully and that the AT paging is not missed.

BRIEF DESCRIPTION OF THE DRAWINGS

FIG. 1 shows a flowchart of an exemplary method for paging access terminals.

DETAILED DESCRIPTION

Figure 2:
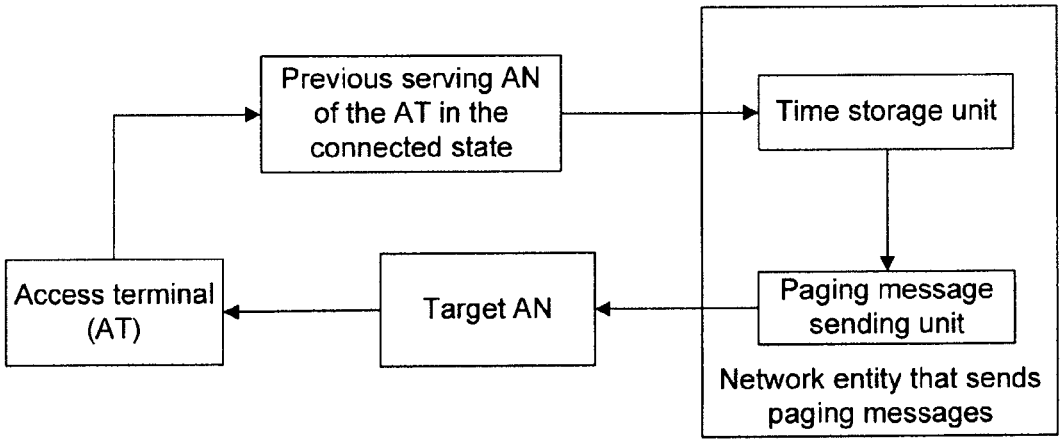
FIG. 2 shows the structure of an exemplary system for paging access terminals.

To make the objective, technical solution and advantages of the embodiments clearer, the following describes the embodiments in detail in combination with the accompanying drawings.

In the embodiments, when the network entity sends a paging message to the target AN, the paging message carries the information required for calculating the time when the AT wakes to monitor the paging message. The information includes the absolute time that is determined according to the time when the AT previously shifts from the connected state to the idle state. Upon receipt of the paging message, the AN determines when to send the paging message to the AT according to the carried information.

Herein the absolute time may be equal to the time when the AT previously shifts from the connected state to the idle state or the preceding time converted by using a preset algorithm. For example, the absolute time Tc is equal to the time when the AT previously shifts from the connected state to the idle state plus a preset duration.

FIG. 1 is an exemplary flowchart of the method for paging access terminals. The method includes the following steps:

Step 101: Upon receipt of data from the network, the network entity sends a paging message to the current serving AN of the AT. The parameters carried in the paging message include session seed, three periods that the system may adopt, namely, period 1, period 2 and period 3, the wake counts in different periods, namely, wake count 1, wake count 2, and wake count 3, and the absolute time Tc that is determined according to the time when the AT previously shifts from the connected state to the idle state.

The absolute time Tc in the paging message is sent to the serving AN through a Connection Close message after the AT is disconnected but before the AT enters the idle state. The current serving AN sends the Tc carried in the Connection Close message to the network entity that sends the paging message.

Alternatively, when the current serving AN of the AT determines that the AT is disconnected exceptionally, the serving AN monitors the state of the radio link with the AT and determines the time when the AT enters the idle state. It then determines the Tc according to the determined time, and sends the Tc to the network entity that sends the paging message.

The Tc may be equal to the time when the AT previously enters the idle state or the determined time converted by using a preset algorithm.

In this step, the network entity that sends the paging message may be the anchor AN of the AT or a special paging controller.

Step 102: The current serving AN of the AT forwards the received paging message to each target AN.

Step 103: Upon receipt of the paging message, each target AN calculates the time when the AT wakes to monitor the paging message according to the information carried in the paging message.

The method for calculating the time when the AT wakes to monitor the paging message by the target AN includes:

A. The target AN performs Hash function conversion on the session seed carried in the paging message and obtains the feature number R of the AT.

B. The target AN puts the R and period 1, period 2, wake count 1, and wake count 2 carried in the paging message into formula 1 to calculate absolute time $T_{12}$ and $T_{23}$.

$$T_{12}=T_c+\text{Period1}-[(T_c+256\times R)\bmod \text{Period1}]+\text{Period1}\times[24\times(\text{WakeCount1}+1)-1]$$

$$T_{23}=T_{12}+\text{Period2}-[(T_{12}+256\times R)\bmod \text{Period2}]+\text{Period2}\times[24\times(\text{WakeCount2}+1)-1] \quad (1)$$

Different forms of formulas regarding $T_{12}$ and $T_{23}$ are available in different systems. The Tc in formula 1 indicates the absolute time that is determined according to the time when the AT previously shifts from the connected state to the idle state.

C. The target AN compares the system time with the calculated $T_{12}$ and $T_{23}$, and then determines the period values that the system adopts in different time scopes according to formula 2.

$$\text{Period}=\begin{cases} Period1, \text{ System time} < T_{12} \\ Period2, T_{12} \le \text{System time} < T_{23} \\ Period3, \text{ Other system time} \end{cases} \quad (2)$$

D. The determined period value, R, and offset values of the attribute parameters in each sector that are obtained in the overhead message broadcasted by the system are put into formula 3 to calculate the time when the AT wakes to monitor the paging message.

$$(T+256*R)\bmod \text{Period}=\text{Offset} \quad (3)$$

T indicates the time when the AT wakes to monitor the paging message. R indicates the number of features that are used to identify the AT. In some radio systems, the offset value in each sector is equal to 0. Period indicates the period that the AT currently uses.

Step 104: The target AN sends the paging message to the AT at the calculated time when the AT wakes to monitor the paging message.

In the preceding embodiment, the network entity sends the paging message to the target AN through the current serving AN of the AT. In fact, the network entity may directly send the paging message to the target AN without using the serving AN of the AT.

An embodiment of the present disclosure provides a system for paging access terminals. The system includes an AT, at least a target AN and a network entity that sends a paging message, as shown in FIG. 2.

The network entity that sends the paging message is adapted to send the paging message to the target AN. The paging message carries the information required for calculating the time when the AT wakes to monitor the paging message. The information includes the absolute time that is determined according to the time when the AT previously shifts from the connected state to the idle state.

The target AN is adapted to receive the paging message from the network entity that sends the paging message. It uses the information carried in the received paging message to calculate the time when the AT wakes to monitor the paging message. It also sends the received paging message to the AT that requires paging at the calculated time.

The AT is adapted to receive the paging message sent from the target AN.

In this system, the network entity that sends the paging message includes a time storage unit and a paging message sending unit.

The time storage unit is adapted to store the absolute time Tc that is determined according to the time when the AT previously shifts from the connected state to the idle state.

The paging message sending unit is adapted to carry the absolute time Tc that is stored in the time storage unit with other information used for calculating the time when the AT wakes to monitor the paging message within the paging message, and sends the paging message to the target AN.

The system further includes the serving AN of the AT in the connected state.

The AT is further adapted to send a Connection Close message to the serving AN after the AT is disconnected and before the AT enters the idle state. The serving AN determines the absolute time Tc according to the time carried in the Connection Close message from the AT, and also sends the Tc to the time storage unit.

Alternatively, when the serving AN of the AT determines that the AT is disconnected exceptionally and enters the idle state, the serving AN monitors the state of the radio link with the AT and determines the time when the AT enters the idle state. It then determines the Tc according to the preceding time, and sends the Tc to the time storage unit.

The serving AN of the AT may also send the determined time when the AT enters the idle state to the time storage unit. When sending a paging message, the paging message sending unit determines the absolute time Tc according to the time that is determined according to the time when the AT enters the idle state. It carries the Tc in the paging message with other information used for calculating the time when the AT wakes to monitor the paging message, and sends the paging message to the target AN.

The system may further include the serving AN of the AT. The network entity may send the paging message to the target AN through the current serving AN.

The current serving AN of the AT may be the same as or different from the previously serving AN of the AT in the connected state.

In this system, the network entity that sends the paging message may be the anchor AN of the AT or other special paging controllers.

As seen from the preceding embodiments, by carrying in the paging message sent to the target AN the absolute time that is determined according to the time when the AT previously shifts from the connected state to the idle state, the embodiments enable the target AN to calculate the time when the AT wakes to monitor the paging message in any scenario according to the information carried in the paging message. In this way, the embodiments can ensure that the target AN does not miss paging the AT.

Although the invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

The invention claimed is:

1. A method for paging access terminals, comprising:

receiving, by a target access network, AN, a *first* paging message from a network entity, wherein the *first* paging message carries information required for calculating the time when an access terminal, AT, wakes to monitor [the] *a second* paging message, and the information includes an absolute time determined according to the time when the AT previously shifts from the connected state to the idle state; and determining, by the target AN, the time to send *the second* paging message to the AT according to the information carried in the *first* paging message.

2. The method of claim 1, before receiving the *first* paging message from the network entity, further comprising:

sending, by a current serving AN of the AT, the absolute time to the network entity, when the AT previously shifts from the connected state to the idle state.

3. The method of claim 1, before receiving the *first* paging message from the network entity, further comprising:

monitoring, by a current serving AN of the AT, the state of the radio link between the current serving AN and the AT when the AT is disconnected exceptionally, previously shifts from the connected state to the idle state;

determining, by the current serving AN, a time when the AT previously shifts from the connected state to the idle state;

determining, by the current serving AN, the absolute time according to the time;

sending, by the current serving AN, the absolute time to the network entity.

4. The method of [any one of] claim 1, wherein the network entity is an anchor AN of the AT or a special paging controller.

5. The method of claim 1, wherein the absolute time is equal to the time when the AT previously shifts from the connected state to the idle state.

6. The method of claim 1, wherein the absolute time is determined by converting the time when the AT previously shifts from the connected state to the idle state with a preset algorithm.

7. A system for paging access terminals, comprising: at least a target access network, AN, and a network entity, wherein the network entity is adapted to send a *first* paging message to the target AN, wherein, the *first* paging message carries an information required for calculating the time when an access terminal, AT, wakes to monitor [the] *a second* paging message, and the information includes an absolute time that is determined according to the time when the AT previously shifts from the connected state to the idle state; and the target AN is adapted to receive the *first* paging message and use the information carried in the *first* paging message to calculate the time when the AT wakes to monitor the *second* paging message and send the *second* paging message to the AT at the calculated time.

8. The system of claim 7, wherein the network entity comprises a time storage unit and a paging message sending unit, wherein the time storage unit is adapted to store the absolute time that is determined according to the time when the AT previously shifts from the connected state to the idle state; and the paging message sending unit is adapted to carry the absolute time that is stored in the time storage unit with other information used for calculating the time when the AT wakes to monitor the *second* paging message within the *first* paging message and send the *first* paging message to the target AN.

9. The system of claim 8, further comprising: a serving AN of the AT, wherein the serving AN is adapted to receive the time when the AT previously shifts from the connected state to the idle state sent by the AT, to determine the absolute time according to the received time when the AT previously shifts from the connected state to the idle state, and to send the absolute time to the time storage unit.

10. The system of claim 8, further comprising: a serving AN of the AT, wherein the serving AN is adapted to monitor the state of the radio link between the serving AN and the AT when the serving AN of the AT determines that the AT is disconnected exceptionally and enters the idle state, to determine the time when the AT previously shifts from the connected state to the idle state, to determine the absolute time according to the time, and to send the absolute time to the time storage unit.

11. [A] *An* apparatus for paging access terminal, comprising: a time storage unit and a paging message sending unit, wherein the time storage unit is adapted to store the absolute time that is determined according to the time when the AT previously shifts from the connected state to the idle state; and the paging message sending unit is adapted to carry the absolute time that is stored in the time storage unit with other information used for calculating the time when the AT wakes to monitor [the] *a second* paging message within [the] *a first* paging message and send the *first* paging message to the target AN.

12. The apparatus of claim 11, wherein the apparatus is one of an anchor AN of the AT and a special paging controller.

* * * * *